(12) United States Patent
Jinno (10) Patent No.: US 7,698,045 B2
(45) Date of Patent: Apr. 13, 2010

(54) VEHICLE AND CONTROL METHOD OF VEHICLE

(75) Inventor: Kunihiko Jinno, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 98 days.

(21) Appl. No.: 12/278,691

(22) PCT Filed: Oct. 16, 2007

(86) PCT No.: PCT/JP2007/070151

§ 371 (c)(1),
(2), (4) Date: Aug. 7, 2008

(87) PCT Pub. No.: WO2008/084581

PCT Pub. Date: Jul. 17, 2008

(65) Prior Publication Data

US 2009/0063009 A1    Mar. 5, 2009

(30) Foreign Application Priority Data

Dec. 28, 2006   (JP) .............................. 2006-355912

(51) Int. Cl.
*G06F 19/00* (2006.01)
*F02D 29/02* (2006.01)
(52) U.S. Cl. ..................... 701/102; 701/112; 123/179.5
(58) Field of Classification Search ................ 701/102, 701/112, 113; 123/179.4, 179.5
See application file for complete search history.

(56) References Cited

U.S. PATENT DOCUMENTS 6,466,860 B2 * 10/2002 Kaneko ...................... 701/112
7,281,510 B2 * 10/2007 Kondo ..................... 123/179.5

FOREIGN PATENT DOCUMENTS

| JP | 10-278569 A | 10/1998 |
| JP | 2004-68675 A | 3/2004 |
| JP | 2004-204740 A | 7/2004 |
| JP | 2005-337173 A | 12/2005 |
| JP | 2006-142854 A | 6/2006 |
| JP | 2009-41460 A * | 2/2009 |
| WO | WO 2004/070180 A1 * | 8/2004 |

* cited by examiner

*Primary Examiner*—Hieu T Vo
(74) *Attorney, Agent, or Firm*—Kenyon & Kenyon LLP (57) ABSTRACT

In a vehicle of the invention, the lower between a first permissive water temperature based on an outside air temperature Tout and an elapsed time since system activation and a second permissive water temperature based on a target air outlet temperature in an air conditioning system is set to an intermittent operation permissive water temperature. When a cooling water temperature of an engine is not lower than the set intermittent operation permissive water temperature, intermittent operation of the engine is permitted. When the cooling water temperature of the engine is lower than the set intermittent operation permissive water temperature, on the other hand, intermittent operation of the engine is prohibited. This arrangement ensures appropriate control of the intermittent operation of the engine and thus effectively improves the fuel efficiency of the vehicle.

11 Claims, 6 Drawing Sheets

Fig. 8

VEHICLE AND CONTROL METHOD OF VEHICLE

This is a 371 national phase application of PCT/JP2007/070151 filed 16 Oct. 2007, claiming priority to Japanese Patent Application No. JP 2006-355912 filed 28 Dec. 2006, the contents of which are incorporated herein by reference.

TECHNICAL FIELD

The present invention relates to a vehicle and a control method of the vehicle. More specifically the invention pertains to a vehicle equipped with an internal combustion engine and a control method of such a vehicle.

BACKGROUND ART

A proposed structure of a vehicle is equipped with an engine operated to output driving power and with a motor operated to output driving power. The start of the engine is controlled according to a target air outlet temperature of an air outlet of an air conditioning system provided in a passenger compartment and a cooling water temperature of the engine, on a start of the vehicle and during a low speed drive of the vehicle (see, for example, Japanese Patent Laid-Open No. H10-278569). The vehicle of this proposed structure refers to the target air outlet temperature and the cooling water temperature of the engine and determines the requirement for heating the passenger compartment in the low cooling water temperature condition. Upon the requirement for heating the passenger compartment, the engine is started even on the start of the vehicle or during the low-speed drive of the vehicle. The cooling water heated by the operation of the engine is used to heat the passenger compartment.

DISCLOSURE OF THE INVENTION

In the vehicle of this prior art structure, the relatively high load operation of the engine by the cold system activation leads to the relatively fast increase in cooling water temperature of the engine. While the temperature in the passenger compartment is still low, however, the operation of the engine is not automatically stopped on the start of the vehicle or during the low-speed drive of the vehicle. This causes the poor fuel efficiency of the vehicle.

In the vehicle and the vehicle control method, there would thus be a demand for ensuring appropriate control of intermittent operation of an internal combustion engine and thereby improving the fuel efficiency.

At least part of the above and the other related demands is attained by a vehicle and a control method of the vehicle having the configurations discussed below.

The present invention is directed to a vehicle equipped with an internal combustion engine. The vehicle includes: an elapsed time counter used to count an elapsed time since system activation of the vehicle; an auto stop permissive water temperature setting module configured to set an auto stop permissive water temperature as a criterion for permitting an auto stop of the internal combustion engine, based on the count of the elapsed time; a cooling water temperature measurement unit used to measure cooling water temperature of the internal combustion engine; and an auto stop restart controller configured to automatically stop operation of the internal combustion engine upon satisfaction of at least one preset auto stop condition including a condition that the measured cooling water temperature is not lower than the set auto stop permissive water temperature, and to automatically restart the operation of the internal combustion engine upon satisfaction of a preset auto start condition during an auto stop of the internal combustion engine.

The vehicle according to one aspect of the invention sets the auto stop permissive water temperature as the criterion for permitting an auto stop of the internal combustion engine, based on the elapsed time since system activation of the vehicle. The vehicle automatically stops the operation of the internal combustion engine upon satisfaction of the at least one preset auto stop condition including the condition that the cooling water temperature of the internal combustion engine is not lower than the set auto stop permissive water temperature. The vehicle automatically restarts the operation of the internal combustion engine upon satisfaction of the preset auto start condition during an auto stop of the internal combustion engine. The auto stop of the internal combustion engine is determined according to the auto stop permissive water temperature set based on the elapsed time since system activation of the vehicle. This arrangement ensures appropriate auto stop and auto restart of the internal combustion engine or appropriate control of intermittent operation of the internal combustion engine and thereby effectively improves the fuel efficiency of the vehicle, compared with the conventional control of automatically stopping the operation of the internal combustion engine without taking into account the elapsed time since system activation of the vehicle.

In one preferable application of the vehicle according to this aspect of the invention, the auto stop permissive water temperature setting module sets the auto stop permissive water temperature to be higher with an increase in count of the elapsed time. A relatively low temperature is set to the auto stop permissive water temperature during a relatively short elapsed time since system activation of the vehicle. This arrangement increases the frequency of the intermittent operation of the internal combustion engine during the relatively short elapsed time and thereby improves the fuel efficiency of the vehicle.

In one preferable embodiment of the invention, the vehicle further has an outside air temperature measurement unit used to measure an outside air temperature. The auto stop permissive water temperature setting module sets the auto stop permissive water temperature to be lower with an increase in measured outside air temperature. The intermittent operation of the internal combustion engine is thus controllable with the measured outside air temperature as well as with the elapsed time since system activation of the vehicle. The auto stop permissive water temperature is set to be lower with an increase in measured outside air temperature. This arrangement increases the frequency of the intermittent operation of the internal combustion engine at the high outside air temperature and thereby improves the fuel efficiency of the vehicle.

In another preferable embodiment of the invention, the vehicle further has a fuel efficiency preference switch operated to give preference to fuel efficiency. The auto stop permissive water temperature setting module sets the auto stop permissive water temperature to be lower in an ON condition of the fuel efficiency preference switch, compared with the auto stop permissive water temperature set in an OFF condition of the fuel efficiency preference switch. This arrangement increases the frequency of the intermittent operation of the internal combustion engine in the ON condition of the fuel efficiency preference switch, compared with the frequency of the intermittent operation in the OFF condition of the fuel efficiency preference switch, thus improving the fuel efficiency of the vehicle.

In still another preferable embodiment of the invention, the vehicle further has an air conditioning system configured to blow air of a target air outlet temperature out of an air outlet provided in a passenger compartment and thereby condition air in the passenger compartment. The auto stop permissive water temperature setting module sets the auto stop permissive water temperature based on the count of the elapsed time and the target air outlet temperature. The intermittent operation of the internal combustion engine is thus controllable with the target air outlet temperature in the air conditioning system as well as with the elapsed time since system activation of the vehicle. In one preferable application of the vehicle of this embodiment, the auto stop permissive water temperature setting module sets a first temperature based on the count of the elapsed time, sets a second temperature based on the target air outlet temperature, and sets the lower between the first temperature and the second temperature to the auto stop permissive water temperature. This arrangement further increases the frequency of the intermittent operation of the internal combustion engine and thereby improves the fuel efficiency of the vehicle.

In still another preferable embodiment of the invention, the vehicle further having: a motor constructed to enable output of driving power, and the auto stop restart controller automatically stops the operation of the internal combustion engine upon a condition that the vehicle is drivable with only output power of the motor as one of the preset auto stop condition. Further, the auto stop restart controller may automatically stop the operation of the internal combustion engine upon a condition that a brake is on during a stop of the vehicle as one of the preset auto stop condition.

The present invention is also directed to a vehicle control method of controlling a vehicle equipped with an internal combustion engine. The vehicle control method sets an auto stop permissive water temperature as a criterion for permitting an auto stop of the internal combustion engine, based on an elapsed time since system activation of the vehicle. The vehicle control method automatically stops operation of the internal combustion engine upon satisfaction of at least one preset auto stop condition including a condition that a cooling water temperature of the internal combustion engine is not lower than the set auto stop permissive water temperature. The vehicle control method automatically restarts the operation of the internal combustion engine upon satisfaction of a preset auto start condition during an auto stop of the internal combustion engine.

The vehicle control method according to one aspect of the invention sets the auto stop permissive water temperature as the criterion for permitting an auto stop of the internal combustion engine, based on the elapsed time since system activation of the vehicle. The vehicle control method automatically stops the operation of the internal combustion engine upon satisfaction of the at least one preset auto stop condition including the condition that the cooling water temperature of the internal combustion engine is not lower than the set auto stop permissive water temperature. The vehicle control method automatically restarts the operation of the internal combustion engine upon satisfaction of the preset auto start condition during an auto stop of the internal combustion engine. The auto stop of the internal combustion engine is determined according to the auto stop permissive water temperature set based on the elapsed time since system activation of the vehicle. This arrangement ensures appropriate auto stop and auto restart of the internal combustion engine or appropriate control of intermittent operation of the internal combustion engine and thereby effectively improves the fuel efficiency of the vehicle, compared with the conventional control of automatically stopping the operation of the internal combustion engine without taking into account the elapsed time since system activation of the vehicle.

In one preferable application of the vehicle control method according to this aspect of the invention, the vehicle control method sets the auto stop permissive water temperature to be higher with an increase in elapsed time. A relatively low temperature is set to the auto stop permissive water temperature during a relatively short elapsed time since system activation of the vehicle. This arrangement increases the frequency of the intermittent operation of the internal combustion engine during the relatively short elapsed time and thereby improves the fuel efficiency of the vehicle.

In another preferable application of the vehicle control method according to this aspect of the invention, the vehicle is equipped with an air conditioning system configured to blow air of a target air outlet temperature out of an air outlet provided in a passenger compartment and thereby condition air in the passenger compartment. The vehicle control method may set a first temperature to be higher with an increase in elapsed time, set a second temperature to be higher with an increase in target air outlet temperature, and set the lower between the first temperature and the second temperature to the auto stop permissive water temperature. The intermittent operation of the internal combustion engine is thus controllable with the target air outlet temperature in the air conditioning system as well as with the elapsed time since system activation of the vehicle. This arrangement further increases the frequency of the intermittent operation of the internal combustion engine and thereby improves the fuel efficiency of the vehicle.

BEST MODES OF CARRYING OUT THE INVENTION

Figure 1:
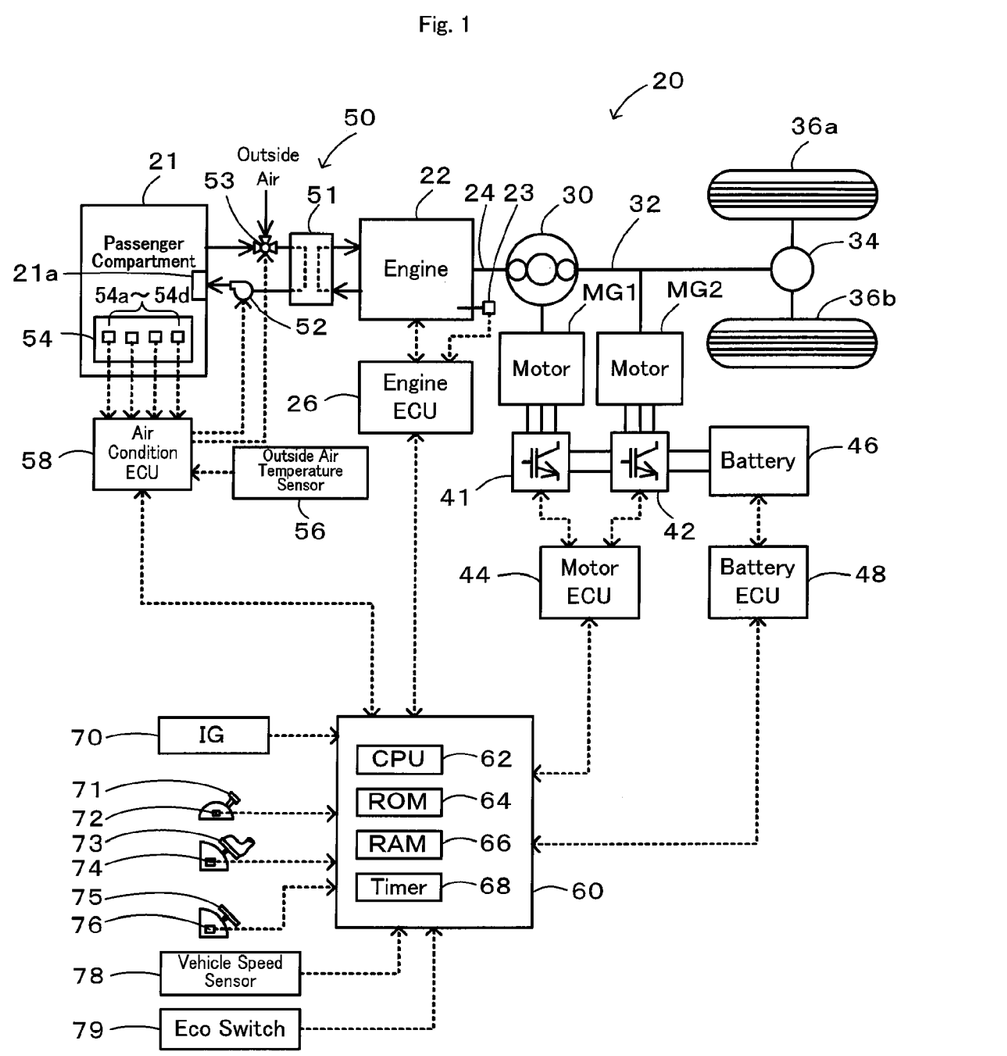
FIG. 1 schematically illustrates the configuration of a hybrid vehicle 20 in one embodiment of the invention.

One mode of carrying out the invention is described below as a preferred embodiment with reference to the accompanied drawings. FIG. 1 schematically illustrates the configuration of a hybrid vehicle 20 in one embodiment of the invention. As illustrated, in the hybrid vehicle 20 of the embodiment, an engine 22 is driven with injection control of a fuel like gasoline or light oil and with ignition control by an engine electronic control unit (hereafter referred to as engine ECU) 26. A planetary gear mechanism 30 has three rotational elements, a sun gear, a ring gear, and a carrier. Among the three rotational elements, the carrier is connected to a crankshaft 24 of the engine 22, while the ring gear is connected to a driveshaft 32 linked to drive wheels 36a and 36b via a differential gear 34. A motor MG1 has a rotor connected to the sun gear of the planetary gear mechanism 30 and is constructed as a synchronous motor generator driven via an inverter 41 under switching control by a motor electronic control unit (hereafter referred to as motor ECU) 44. A motor MG2 has a rotor connected to the driveshaft 32 in such a manner as to enable power input and power output and is constructed as a synchronous motor generator driven via an inverter 42 under switching control by the motor ECU 44. A battery 46 is under management of a battery electronic control unit (hereafter referred to as battery ECU) 48 and is arranged to enable transmission of electric power to and from the motors MG1 and MG2. An air conditioning system 50 is driven to condition the air in a passenger compartment 21. A hybrid electronic control unit 60 controls the operations of the whole hybrid vehicle 20. The engine ECU 26 inputs detection values of various sensors required for the operation control of the engine 22, for example, a cooling water temperature Tw of the engine 22 from a temperature sensor 23 attached to the engine 22.

In the air conditioning system 50, a heat exchanger 51 is installed in a cooling system of the engine 22 for heat exchange with cooling water. A blower 52 is designed to draw the outside air or the air in the passenger compartment 21 into the heat exchanger 51 and blow the air warmed through the heat exchange by the heat exchanger 51 out of an air outlet 21a provided in the passenger compartment 21. A switchover mechanism 53 works to switch over the air drawn by the blower 52 between the outside air and the air in the passenger compartment 21. An operation panel 54 is also provided in the passenger compartment 21. An air conditioning electronic control unit (hereafter referred to as air conditioning ECU) 58 controls the operations of the whole air conditioning system 50. The air conditioning ECU 58 inputs a blower switch signal BSW from a blower switch 54a set on the operation panel 54 to turn on and off a heater, a set temperature T* from a set temperature switch 54b set on the operation panel 54 to set the temperature in the passenger compartment 21, a passenger compartment temperature Tin from a temperature sensor 54c set on the operation panel 54 to measure the temperature in the passenger compartment 21, an amount of solar radiation Q in the passenger compartment 21 from an insolation sensor 54d set on the operation panel 54, and an outside air temperature Tout from an outside air temperature sensor 56 attached to the outside of the passenger compartment 21. The air conditioning ECU 58 sets a target air outlet temperature Tao of the air outlet 21a provided in the passenger compartment 21 based on these input signals to make the passenger compartment temperature Tin sufficiently close to the set temperature T*. The air conditioning ECU 58 then operates and controls the blower 52 and the switchover mechanism 53 to blow the hot air of the set target air outlet temperature Tao out of the air outlet 21a. The air conditioning ECU 58 makes communication with the hybrid electronic control unit 60 and outputs data regarding the conditions of the air conditioning system 50 to the hybrid electronic control unit 60 according to the requirements.

The hybrid electronic control unit 60 is constructed as a microprocessor including a CPU 62, a ROM 64 configured to store processing programs, a RAM 66 configured to temporarily store data, a timer 68 designed to count the time, input and output ports (not shown), and a communication port (not shown). The hybrid electronic control unit 60 inputs, via its input port, an ignition signal from an ignition switch 70, a gearshift position SP or a current setting position of a gearshift lever 71 from a gearshift position sensor 72, an accelerator opening Acc or the driver's depression amount of the accelerator pedal 73 from an accelerator pedal position sensor 74, a brake pedal position BP or the driver's depression amount of the brake pedal 75 from a brake pedal position sensor 76, a vehicle speed V from a vehicle speed sensor 78, and an eco switch signal ESW from an eco switch 79 provided in a neighborhood of the driver's seat to give preference to the fuel efficiency of the vehicle. The hybrid electronic control unit 60 is connected with the engine ECU 26, the motor ECU 44, the battery ECU 48, and the air conditioning ECU 58 via the communication port to transmit various control signals and data to and from the engine ECU 26, the motor ECU 44, the battery ECU 48, and the air conditioning ECU 58.

Figure 2:
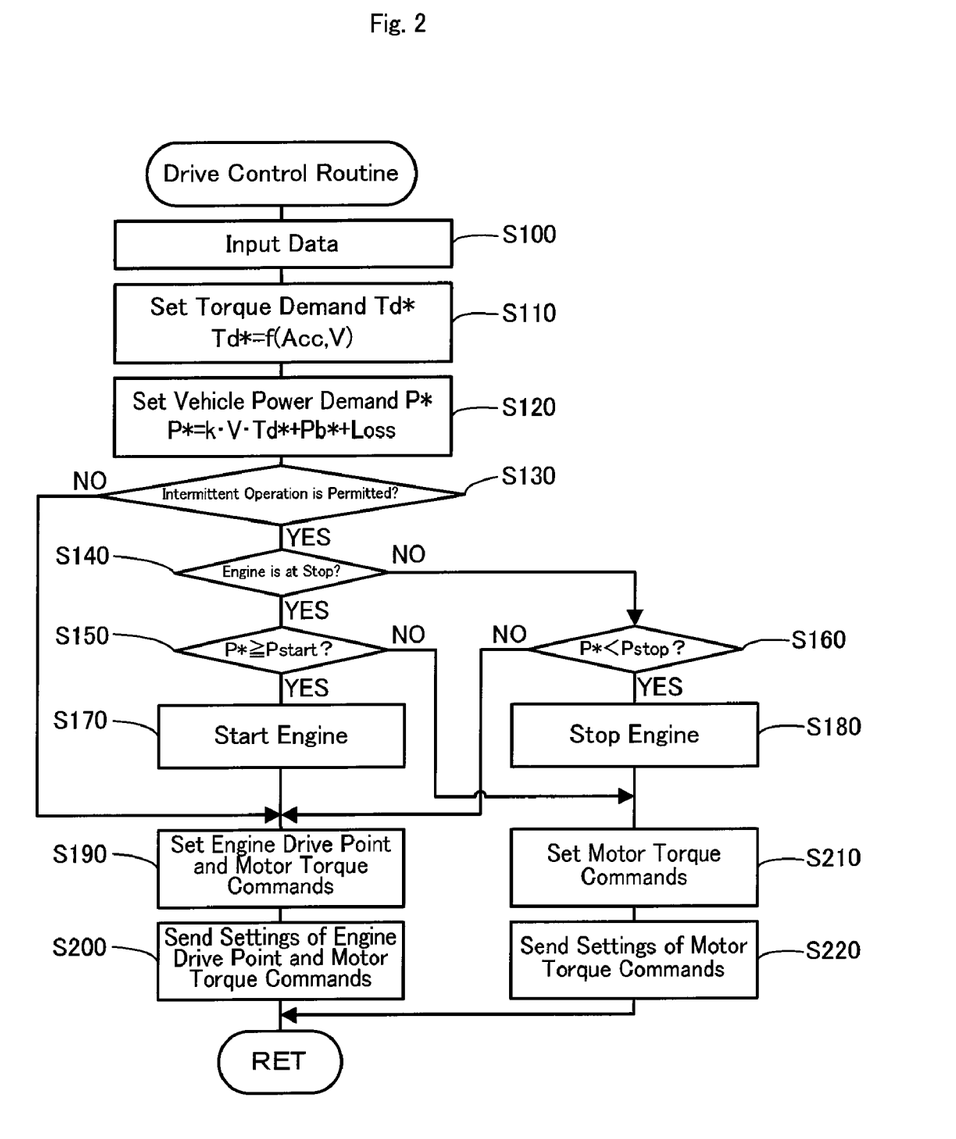
FIG. 2 is a flowchart showing a drive control routine executed by a hybrid electronic control unit 60 mounted on the hybrid vehicle 20 of the embodiment.
Figure 3:
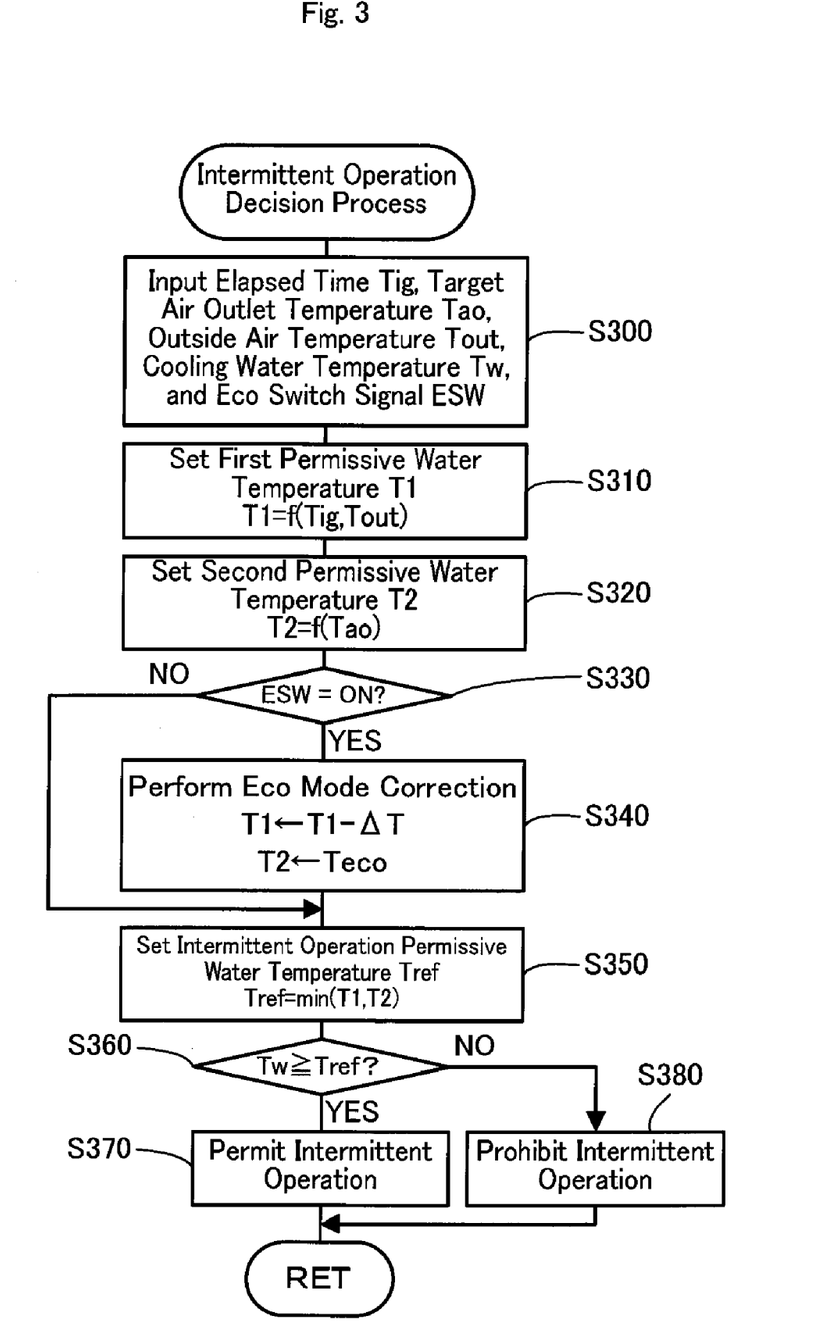
FIG. 3 is a flowchart showing an intermittent operation decision process of determining permission or prohibition of intermittent operation of the engine 22 in the drive control routine of FIG. 2.

The following describes the operations of the hybrid vehicle 20 of the embodiment having the above configuration. FIG. 2 is a flowchart showing a drive control routine executed by the hybrid electronic control unit 60 in the embodiment. FIG. 3 is a flowchart showing an intermittent operation decision process of determining permission or prohibition of intermittent operation of the engine 22 in the drive control routine of FIG. 2. For convenience of explanation, the description sequentially regards the series of drive control according to the drive control routine of FIG. 2 and the determination of permission or prohibition of intermittent operation according to the intermittent operation decision process of FIG. 3.

On the start of the drive control routine, the CPU 62 of the hybrid electronic control unit 60 first inputs various data required for the drive control, for example, the gearshift position SP from the gearshift position sensor 72, the accelerator opening Acc from the accelerator pedal position sensor 74, the brake pedal position BP from the brake pedal position sensor 76, the vehicle speed V from the vehicle speed sensor 78, the eco switch signal ESW from the eco switch 79, rotation speeds Nm1 and Nm2 of the motors MG1 and MG2, and a rotation speed Ne of the engine 22 (step S100). The CPU 62 subsequently sets a torque demand Td* to be output to the driveshaft 32, based on the input accelerator opening Acc and the input vehicle speed V (step S110), and sets a vehicle power demand P* (step S120). The vehicle power demand P* is given as the sum of a drive power, which is the product of the set torque demand Td* and a rotation speed of the driveshaft 32, a charge-discharge power demand Pb* to be charged into or discharged from the battery 46, and a potential loss in the driving system. The rotation speed of the driveshaft 32 may be calculated from the rotation speed Nm2 of the motor MG2 or may alternatively be calculated from the vehicle speed V.

The CPU 62 then determines permission or prohibition of intermittent operation of the engine 22 according to the intermittent operation decision process described later (step S130). In response to prohibition of the intermittent operation at step S130, the CPU 62 sets a target rotation speed and a target torque as a drive point of the engine 22 to ensure efficient output of the set vehicle power demand P* from the engine 22, sets a torque command of the motor MG1 to enable the operation of the engine 22 at the set target rotation speed, and sets a torque command of the motor MG2 to ensure output of the set torque demand Td* to the driveshaft 32 (step S190). The CPU 62 sends the settings of the target rotation speed and the target torque of the engine 22 to the engine ECU 26 and the settings of the torque commands of the motors MG1 and MG2 to the motor ECU 44 (step S200), in order to drive the engine 22 at the set drive point and to drive the motors MG1 and MG2 with the respectively set torque commands. The drive control routine is then terminated. The engine ECU 26 receives the settings of the target rotation speed and the target torque and performs series of controls including fuel injection control and ignition control of the engine 22 to drive the engine 22 at the drive point defined by the target rotation speed and the target torque. The motor ECU 44 receives the settings of the torque commands and performs switching control of switching elements in the inverters 41 and 42 to drive the motors MG1 and MG2 with the set torque commands.

In response to permission of the intermittent operation at step S130, on the other hand, the CPU 62 determines whether the engine 22 is at stop or in operation (step S140). When the engine 22 is at stop (step S140: yes), the CPU 62 subsequently determines whether the vehicle power demand P* is not less than an auto start threshold level Pstart of the engine 22 (step S150). When the engine 22 is in operation (step S140: no), on the other hand, the CPU 62 subsequently determines whether the vehicle power demand P* is less than an auto stop threshold level Pstop of the engine 22 (step S160). The auto start threshold level Pstart and the auto stop threshold level Pstop are set as power values close to a lower limit of an engine efficient operation range where the engine 22 is operable with relatively high efficiency. The auto start threshold level Pstart is set to be greater than the auto stop threshold level Pstop to set hysteresis and prevent frequent auto stop and auto restart. When the engine 22 is in operation (step S140: no) and the vehicle power demand P* is not less than the auto stop threshold level Pstop of the engine 22 (step S160: no), the drive control routine does not automatically stop the operation of the engine 22 but proceeds to steps S190 and S200 to control the operations of the engine 22 and the motors MG1 and MG2. When the engine 22 is in operation (step S140: no) and the vehicle power demand P* is less than the auto stop threshold level Pstop of the engine 22 (step S160: yes), the operation of the engine 22 is to be stopped. The CPU 62 accordingly sends a control signal to the engine ECU 26 to stop the operation of the engine 22 (step S180). The CPU 62 then sets a value '0' to the torque command of the motor MG1 and the torque demand Td* to the torque command of the motor MG2 to enable output of the torque demand Td* from the motor MG2 (step S210), and sends the settings of the torque commands to the motor ECU 44 (step S220) to drive the motors MG1 and MG2 with the set torque commands. The drive control routine is then terminated. When the engine 22 is at stop (step S140: yes) and the vehicle power demand P* is less than the auto start threshold level Pstart of the engine 22 (step S150: no), the operation stop state of the engine 22 is to be continued. The CPU 62 accordingly proceeds to steps S210 and S220 to control the operations of the motors MG1 and MG2. When the engine 22 is at stop (step S140: yes) and the vehicle power demand P* is not less than the auto start threshold level Pstart of the engine (step S150: yes), the engine 22 in the operation stop state is to be restarted. The CPU 62 accordingly sends a control signal of starting the engine 22 to the engine ECU 26 and performs engine start control to restart the engine 22 (step S170). The CPU 62 then proceeds to steps S190 and S200 to control the operations of the engine 22 and the motors MG1 and MG2.

The determination of permission or prohibition of intermittent operation of the engine 22 is explained with reference to the flowchart of FIG. 3. In the intermittent operation decision process of FIG. 3, the CPU 62 of the hybrid electronic control unit 60 first inputs various data required for the determination of permission or prohibition of intermittent operation, that is, an elapsed time Tig since system activation in response to an ON operation of the ignition switch 70, the target air outlet temperature Tao of the air outlet 21a, the outside air temperature Tout, the cooling water temperature Tw, and the eco switch signal ESW from the eco switch 79 (step S300). The elapsed time Tig is a time count on the timer 68 since system activation in response to an ON operation of the ignition switch 70. The target air outlet temperature Tao is set by the air conditioning ECU 58 and is input from the air conditioning ECU 58 by communication. The outside air temperature Tout is measured by the outside air temperature sensor 56 and is input from the air conditioning ECU 58 by communication. The cooling water temperature Tw is measured by the temperature sensor 23 and is input from the engine ECU 26 by communication.

Figure 4:
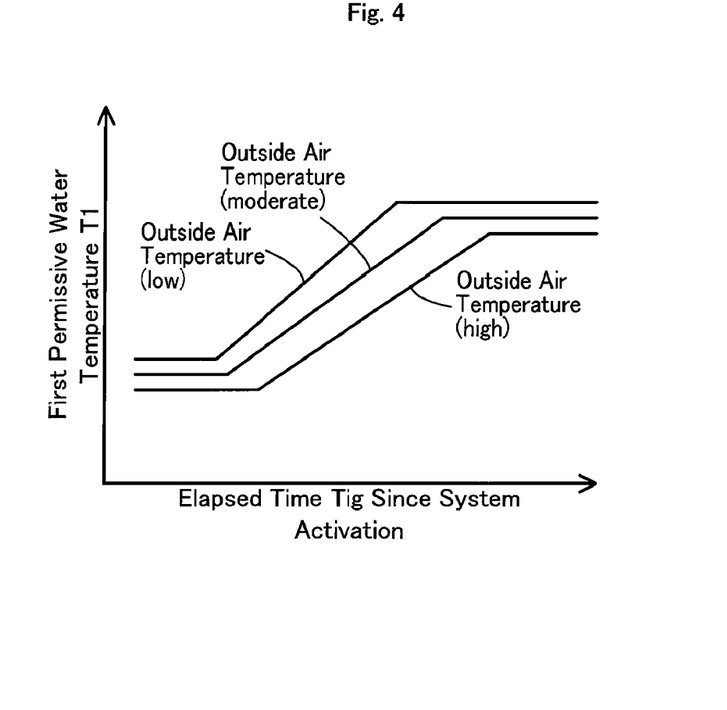
FIG. 4 shows variations in first permissive water temperature T1 against elapsed time Tig with regard to various outside air temperatures Tout as one example.
Figure 5:
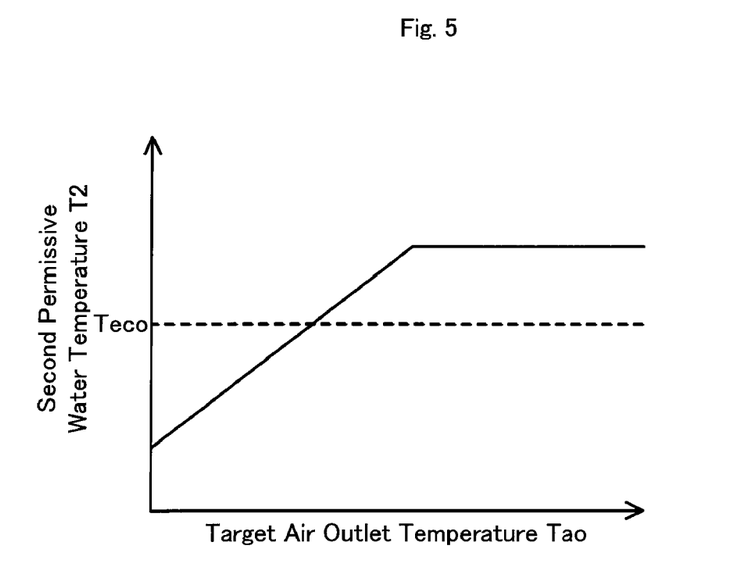
FIG. 5 shows one example of a second permissive water temperature setting map.

After the data input, a first permissive water temperature T1 for permitting intermittent operation of the engine 22 is set based on the input elapsed time Tig and the input outside air temperature Tout (step S310). A second permissive water temperature T2 for permitting intermittent operation of the engine 22 is subsequently set based on the input target air outlet temperature Tao (step S320). The first permissive water temperature T1 is set to be higher with an increase in elapsed time Tig and to be lower with an increase in outside air temperature Tout. A concrete procedure of setting the first permissive water temperature T1 in this embodiment specifies and stores in advance variations in first permissive water temperature T1 against the elapsed time Tig with regard to various settings of the outside air temperature Tout as a first permissive water temperature setting map in the ROM 64 and reads the first permissive water temperature T1 corresponding to the given elapsed time Tig and the given outside air temperature Tout from the first permissive water temperature setting map. FIG. 4 shows variations in first permissive water temperature T1 against elapsed time Tig with regard to various outside air temperatures Tout as one example. The second permissive water temperature T2 is set to be higher with an increase in target air outlet temperature Tao. A concrete procedure of setting the second permissive water temperature T2 in this embodiment specifies and stores in advance a variation in second permissive water temperature T2 against the target air outlet temperature Tao as a second permissive water temperature setting map in the ROM 64 and reads the second permissive water temperature T2 corresponding to the given target air outlet temperature Tao from the second permissive water temperature setting map. One example of the second permissive water temperature setting map is given in FIG. 5. A broken line in FIG. 5 shows an eco mode temperature Teco set to the second permissive water temperature T2 irrespective of the target air outlet temperature Tao when the eco switch 79 is turned on.

The CPU 62 subsequently determines whether the eco switch signal ESW is ON (step S330). When the eco switch signal ESW is ON (that is, when the eco switch 79 is turned on), eco mode correction is performed to give further preference to the fuel efficiency (step S340). The eco mode correction updates the first permissive water temperature T1 to a result of subtraction of a preset correction temperature ΔT from the first permissive water temperature T1 and updates the second permissive water temperature T2 to the eco mode temperature Teco (step S340). The correction temperature ΔT is set to slightly lower the first permissive water temperature T1 and is, for example, 3° C. or 5° C. The eco mode temperature Teco is set to the second permissive water temperature T2 irrespective of the target air outlet temperature Tao as shown in FIG. 5. When the eco switch signal ESW is OFF (that is, when the eco switch 79 is turned off), the intermittent operation decision process skips this eco mode correction.

The CPU 62 then sets the lower between the first permissive water temperature T1 and the second permissive water temperature T2 to an intermittent operation permissive water temperature Tref (step S350) and compares the input cooling water temperature Tw with the set intermittent operation permissive water temperature Tref (step S360). When the cooling water temperature Tw is not lower than the intermittent operation permissive water temperature Tref (step S360: yes), the CPU 62 permits intermittent operation of automatically stopping and restarting the engine 22 (step S370). When the cooling water temperature Tw is lower than the intermittent operation permissive water temperature Tref (step S360: no), on the other hand, the CPU 62 prohibits intermittent operation of automatically stopping and restarting the engine 22 (step S380). The intermittent operation decision process is then terminated.

The determination result of permission or prohibition of intermittent operation of the engine 22 according to the intermittent operation decision process is referred to at step S130 in the drive control routine of FIG. 2. When the intermittent operation of the engine 22 is prohibited, the engine 22 is not automatically stopped. The permission of intermittent operation of the engine 22 can thus be regarded as one condition of automatically stopping the engine 22.

In the hybrid vehicle 20 of the embodiment described above, the intermittent operation permissive water temperature Tref is determined by referring to the first permissive water temperature T1, which is set based on the outside air temperature Tout and the elapsed time Tig since system activation in response to an ON operation of the ignition switch 70. When the cooling water temperature Tw of the engine 22 is not lower than the intermittent operation permissive water temperature Tref, the intermittent operation of the engine 22 is permitted. This arrangement ensures the appropriate control of the intermittent operation of the engine 22, compared with the conventional control of the intermittent operation of an engine without taking into account an elapsed time since system activation of the vehicle. The drive control of this embodiment thus desirably improves the fuel efficiency of the vehicle. The first permissive water temperature T1 is set, based on the outside air temperature Tout as well as the elapsed time Tig since system activation. The frequency of the intermittent operation of the engine 22 is increased at the high outside air temperature Tout. This ensures the better fuel efficiency of the vehicle. The intermittent operation permissive water temperature Tref is set to the lower between the first permissive water temperature T1, which is based on the outside air temperature Tout and the elapsed time Tig since system activation, and the second permissive water temperature T2, which is based on the target air outlet temperature Tao of the air outlet 21a set by the air conditioning ECU 58 of the air conditioning system 50. The intermittent operation of the engine 22 is thus controllable with the target air outlet temperature Tao in the air conditioning system 50 as well as with the elapsed time Tig since system activation of the vehicle. In the ON condition of the eco switch 79, the eco mode correction is performed to compensate both the first permissive water temperature T1 and the second permissive water temperature T2. The frequency of the intermittent operation of the engine 22 is increased in this ON condition of the eco switch 79, compared with the frequency of the intermittent operation of the engine 22 in the OFF condition of the eco switch 79. This further improves the fuel efficiency of the vehicle.

As described above, the hybrid vehicle 20 of the embodiment sets the first permissive water temperature T1 based on the outside air temperature Tout and the elapsed time since system activation. The first permissive water temperature T1 may alternatively be set based on only the elapsed time Tig since system activation independently of the outside air temperature Tout.

In the hybrid vehicle 20 of the embodiment described above, the lower between the first permissive water temperature T1 based on the outside air temperature Tout and the elapsed time Tig since system activation and the second permissive water temperature T2 based on the target air outlet temperature Tao is set to the intermittent operation permissive water temperature Tref. One modified procedure may set the first permissive water temperature T1 to the intermittent operation permissive water temperature Tref without setting the second permissive water temperature T2 based on the target air outlet temperature Tao.

In the hybrid vehicle 20 of the embodiment described above, in the ON condition of the eco switch 79, the eco mode correction is performed to update the first permissive water temperature T1 to the result of subtraction of the preset correction temperature ΔT from the first permissive water temperature T1 and update the second permissive water temperature T2 to the eco mode temperature Teco. The eco mode correction is, however, not restricted to such updating operations but may be any other operations of compensating the first permissive water temperature T1 and the second permissive water temperature T2 in a decreasing direction. The eco mode correction may be omitted when not required.

In the hybrid vehicle 20 of the embodiment described above, the condition for auto stop of the engine 22 is that the vehicle power demand P* is less than the auto stop threshold level Pstop. The condition for auto stop of the engine 22 is, however, not restricted to this power-related condition but may include any of other diverse conditions of enabling the hybrid vehicle 20 to be driven with only the output power of the motor MG2, for example, a condition that a remaining charge level or state of charge SOC of the battery 46 is not lower than a preset reference charge level (for example, 40%) and a condition that the vehicle V is lower than a preset reference speed (for example, 40 km/h).

Figure 6:
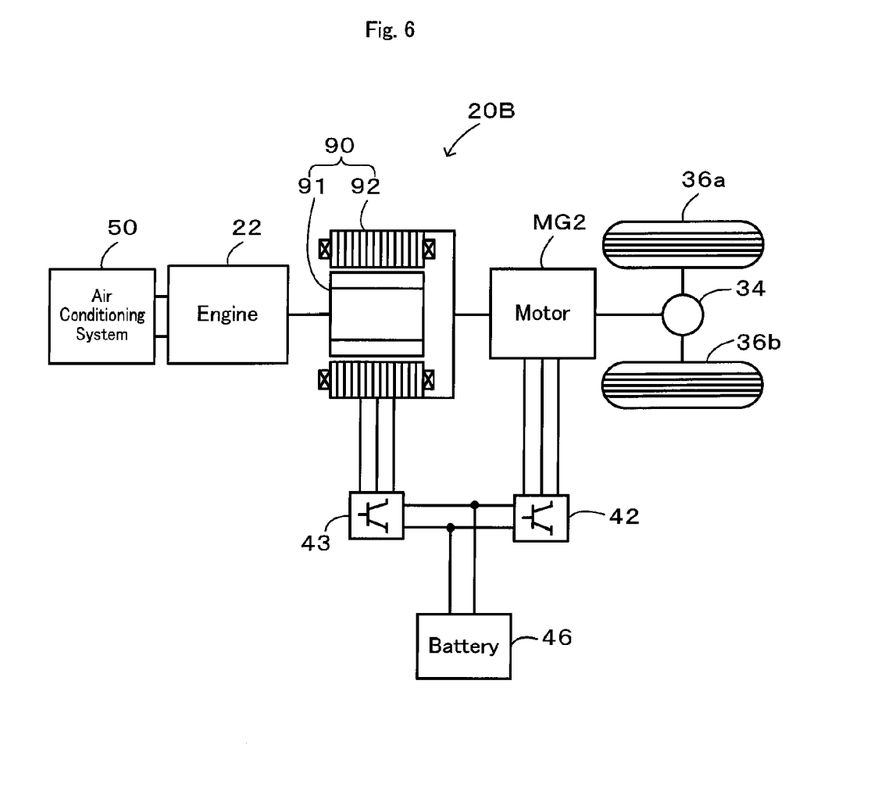
FIG. 6 schematically illustrates the configuration of another hybrid vehicle 20B in one modified example.
Figure 7:
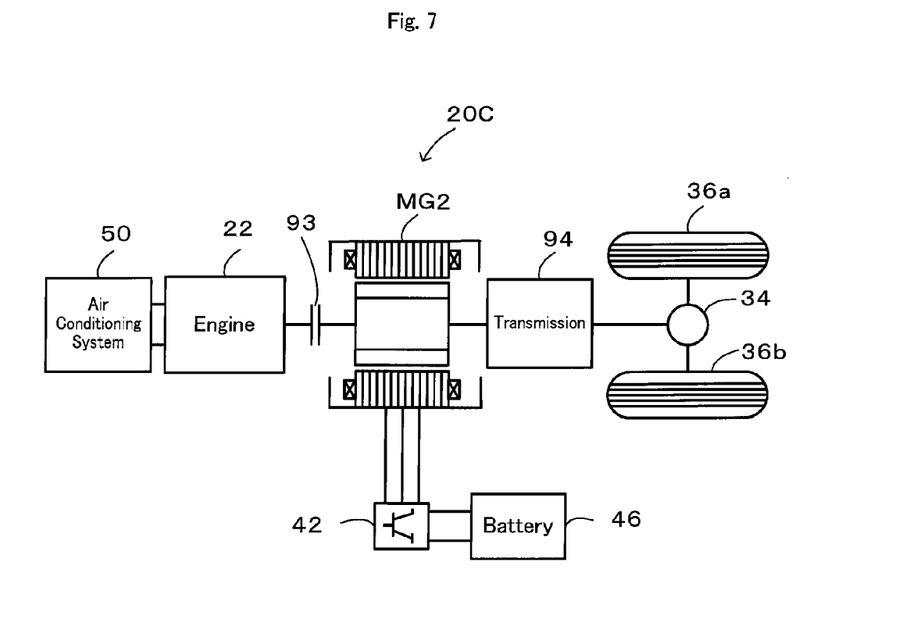
FIG. 7 schematically illustrates the configuration of still another hybrid vehicle 20C in another modified example.

The above embodiment regards the hybrid vehicle 20 including the engine 22, the planetary gear mechanism 30 linked with the crankshaft 24 of the engine 22 and with the driveshaft 32, the motor MG1 connected with the planetary gear mechanism 30, the motor MG2 connected with the driveshaft 32 to enable power input and output, and the air conditioning system 50 configured to condition the air in the passenger compartment 21. The technique of the present invention is not restricted to the hybrid vehicle 20 of this configuration but is also applicable to hybrid vehicles of other configurations. In a hybrid vehicle 20B of one modified configuration shown in FIG. 6, the planetary gear mechanism 30 and the motor MG1 are replaced by a pair rotor motor 90. The pair rotor motor 90 has an inner rotor 91 linked with a crankshaft 24 of an engine 22 and an outer rotor 92 linked with a driveshaft 32 of outputting power to drive wheels 36a and 36b. The pair rotor motor 90 transmits part of the output power of the engine 22 to the driveshaft 32, while converting a residual part of the engine power into electric power. In a hybrid vehicle 20C of another modified configuration shown in FIG. 7, a clutch 93 is provided on a crankshaft 24, and a motor MG2 and an automatic transmission 94 are provided in the downstream of the clutch 93 on the side of drive wheels 36a and 36b.

Figure 8:
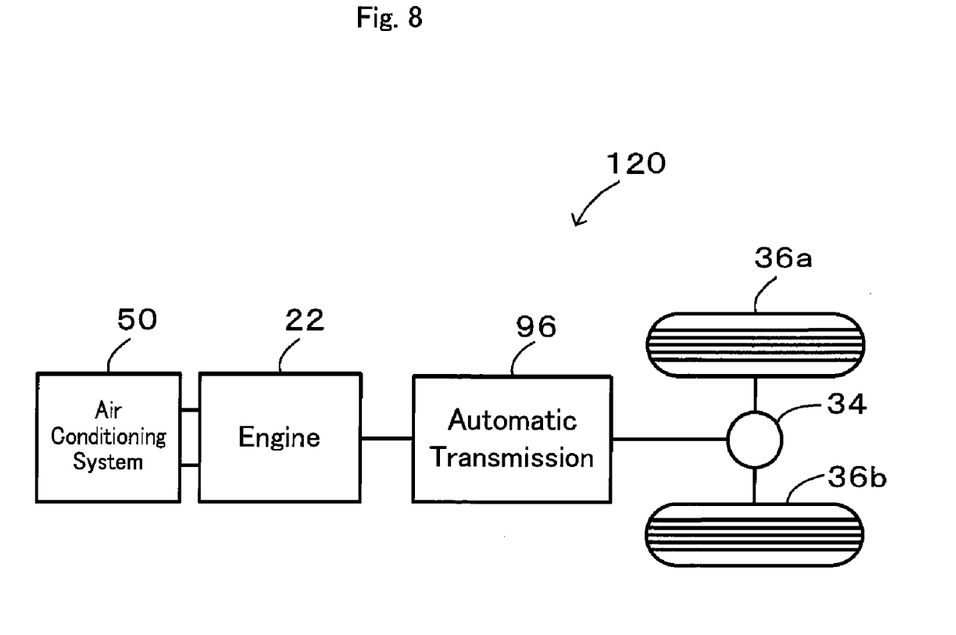
FIG. 8 schematically illustrates the configuration of an automobile 120 in another modified example.

The technique of the invention is not restricted to the hybrid vehicle 20 of the above embodiment or the hybrid vehicles 20B and 20C of the modified examples explained above but is also applicable to conventional engine automobiles. In an automobile 120 shown in FIG. 8, a crankshaft 24 of an engine 22 is connected via an automatic transmission 96 to a driveshaft 32 linked with drive wheels 36a and 36b. In this automobile 120, the condition for auto stop of the engine 22 may include idle stop conditions of the vehicle speed V equal to 0, the brake-on, and the brake master cylinder pressure of not lower than a preset reference pressure level, in addition to the result of the determination of permission or prohibition of intermittent operation according to the intermittent operation decision process described above with reference to FIG. 3. In the drive control of the automobile 120, the first permissive water temperature T1 may be set independently of the outside air temperature Tout but based on only the elapsed time Tig since system activation. The intermittent operation permissive water temperature Tref may be set to the first permissive water temperature T1, regardless of the second permissive water temperature T2 based on the target air outlet temperature Tao. The eco mode correction may be omitted when not required.

The embodiment and its modified examples regard application of the invention to the hybrid vehicle or another automobile. The technique of the present invention is, however, not restricted to the hybrid vehicle or another vehicle but is also applicable to diverse vehicles other than automobiles as well as to control methods of diverse vehicles including hybrid vehicles and automobiles.

The primary elements in the embodiment and its modified examples are mapped to the primary constituents in the claims of the invention as described below. The engine 22 of the embodiment is equivalent to the 'internal combustion engine' of the invention. The timer 68 of counting the elapsed time Tig since system activation in response to an ON operation of the ignition switch 70 in the embodiment is equivalent to the 'elapsed time counter' of the invention. The hybrid electronic control unit 60 executing the processing of steps S310 to S350 in the intermittent operation decision process of FIG. 3 in the embodiment corresponds to the 'auto stop permissive water temperature setting module' of the invention. The processing of steps S310 to S350 sets the lower between the first permissive water temperature T1 based on the outside air temperature Tout and the elapsed time Tig since system activation and the second permissive water temperature T2 based on the target air outlet temperature Tao to the intermittent operation permissive water temperature Tref as the criterion for permitting the intermittent operation of the engine 22. The temperature sensor 23 attached to the engine 22 to measure the cooling water temperature Tw in the embodiment is equivalent to the 'cooling water temperature measurement unit' of the invention. The hybrid electronic control unit 60 executing the processing of steps S360 to S380 in the intermittent operation decision process of FIG. 3 and the processing of steps S130 to S180 in the drive control routine of FIG. 2 corresponds to the 'auto stop restart controller' of the invention. The processing of steps S360 to S380 permits the intermittent operation of the engine 22 at the cooling water temperature Tw of not lower than the intermittent operation permissive water temperature Tref, while prohibiting the intermittent operation of the engine 22 at the cooling water temperature of lower than the intermittent operation permissive water temperature Tref. The processing of steps S130 to S180 identifies satisfaction of the auto stop condition of the engine 22 and stops the operation of the engine 22 when the vehicle power demand P* is less than the auto stop threshold level Pstop during the operation of the engine 22 with the permission of the intermittent operation. The processing of steps S130 to S160 also identifies satisfaction of the auto start condition of the engine 22 and restarts the operation of the engine 22 when the vehicle power demand P* is not less than the auto start threshold level Pstart during the auto stop of the engine 22 with the permission of the intermittent operation. The outside air temperature sensor 56 of the embodiment is equivalent to the 'outside air temperature measurement unit' of the invention. The eco switch 79 of the embodiment is equivalent to the 'fuel efficiency preference switch' of the invention. The air conditioning system 50 and the motor MG2 of the embodiment are respectively equivalent to the 'air conditioning system' and the 'motor' of the invention. The above mapping of the primary elements in the embodiment and its modified examples to the primary constituents in the claims of the invention is not restrictive in any sense but is only illustrative for concretely describing the mode of carrying out the invention. Namely the embodiment and its modified example discussed above are to be considered in all aspects as illustrative and not restrictive.

There may be many modifications, changes, and alterations without departing from the scope or spirit of the main characteristics of the present invention. The scope and spirit of the present invention are indicated by the appended claims, rather than by the foregoing description.

INDUSTRIAL APPLICABILITY

The principle of the present invention is favorably applicable to the manufacturing industries of various vehicles.

The invention claimed is:

1. A vehicle equipped with an internal combustion engine, the vehicle comprising:
   an elapsed time counter used to count an elapsed time since system activation of the vehicle;
   an auto stop permissive water temperature setting module configured to set an auto stop permissive water temperature as a criterion for permitting an auto stop of the internal combustion engine, based on the count of the elapsed time;
   a cooling water temperature measurement unit used to measure cooling water temperature of the internal combustion engine; and
   an auto stop restart controller configured to automatically stop operation of the internal combustion engine upon satisfaction of at least one preset auto stop condition including a condition that the measured cooling water temperature is not lower than the set auto stop permissive water temperature, and to automatically restart the operation of the internal combustion engine upon satisfaction of a preset auto start condition during an auto stop of the internal combustion engine.

2. The vehicle in accordance with claim 1, wherein the auto stop permissive water temperature setting module sets the auto stop permissive water temperature to be higher with an increase in count of the elapsed time.

3. The vehicle in accordance with claim 1, the vehicle further having:
   an outside air temperature measurement unit used to measure an outside air temperature,
   wherein the auto stop permissive water temperature setting module sets the auto stop permissive water temperature to be lower with an increase in measured outside air temperature.

4. The vehicle in accordance with claim 1, the vehicle further having:
   a fuel efficiency preference switch operated to give preference to fuel efficiency,
   wherein the auto stop permissive water temperature setting module sets the auto stop permissive water temperature to be lower in an ON condition of the fuel efficiency preference switch, compared with the auto stop permissive water temperature set in an OFF condition of the fuel efficiency preference switch.

5. The vehicle in accordance with claim 1, the vehicle further having:
an air conditioning system configured to blow air of a target air outlet temperature out of an air outlet provided in a passenger compartment and thereby condition air in the passenger compartment,
wherein the auto stop permissive water temperature setting module sets the auto stop permissive water temperature based on the count of the elapsed time and the target air outlet temperature.

6. The vehicle in accordance with claim 5, wherein the auto stop permissive water temperature setting module sets a first temperature based on the count of the elapsed time, sets a second temperature based on the target air outlet temperature, and sets the lower between the first temperature and the second temperature to the auto stop permissive water temperature.

7. The vehicle in accordance with claim 1, the vehicle further having:
a motor constructed to enable output of driving power,
wherein the auto stop restart controller automatically stops the operation of the internal combustion engine upon a condition that the vehicle is drivable with only output power of the motor as one of the preset auto stop condition.

8. The vehicle in accordance with claim 1, wherein the auto stop restart controller automatically stops the operation of the internal combustion engine upon a condition that a brake is on during a stop of the vehicle as one of the preset auto stop condition.

9. A vehicle control method of controlling a vehicle equipped with an internal combustion engine,
the vehicle control method setting an auto stop permissive water temperature as a criterion for permitting an auto stop of the internal combustion engine, based on an elapsed time since system activation of the vehicle,
the vehicle control method automatically stopping operation of the internal combustion engine upon satisfaction of at least one preset auto stop condition including a condition that a cooling water temperature of the internal combustion engine is not lower than the set auto stop permissive water temperature,
the vehicle control method automatically restarting the operation of the internal combustion engine upon satisfaction of a preset auto start condition during an auto stop of the internal combustion engine.

10. The vehicle control method in accordance with claim 9, the vehicle control method setting the auto stop permissive water temperature to be higher with an increase in elapsed time.

11. The vehicle control method in accordance with claim 9, wherein the vehicle is equipped with an air conditioning system configured to blow air of a target air outlet temperature out of an air outlet provided in a passenger compartment and thereby condition air in the passenger compartment,
the vehicle control method setting a first temperature to be higher with an increase in elapsed time, setting a second temperature to be higher with an increase in target air outlet temperature, and setting the lower between the first temperature and the second temperature to the auto stop permissive water temperature.

* * * * *